July 15, 1941.    G. J. LANE ET AL    2,249,570
FRACTIONATION OF CLAY
Filed July 29, 1940
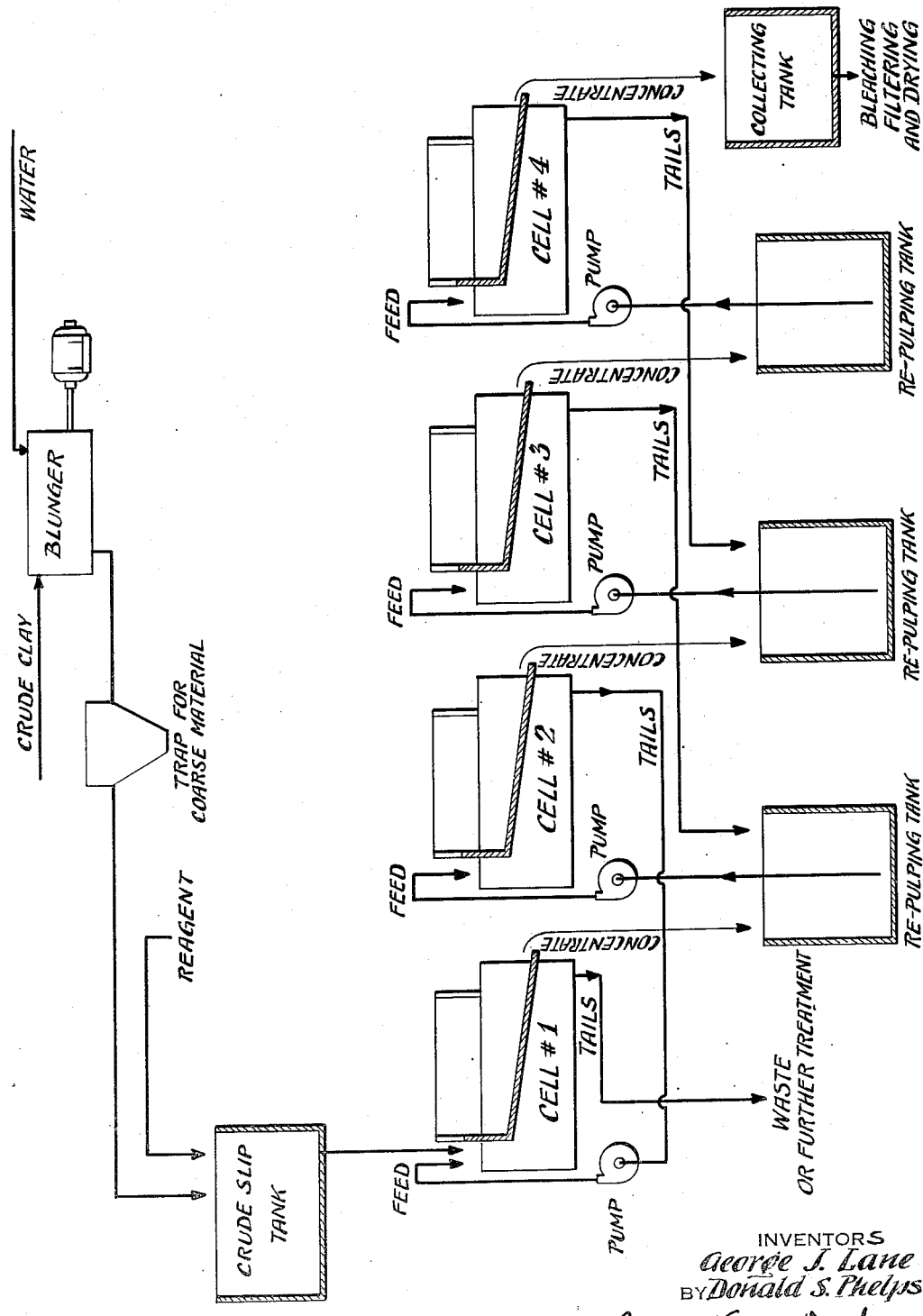
INVENTORS
George J. Lane
BY Donald S. Phelps
Cooper, Kerr & Dunham
ATTORNEYS

UNITED STATES PATENT OFFICE 2,249,570

FRACTIONATION OF CLAY

George J. Lane, Metuchen, N. J., and Donald S. Phelps, Harvard, Mass., assignors to Edgar Brothers Company, Metuchen, N. J., a corporation of New Jersey Application July 29, 1940, Serial No. 348,174

6 Claims. (Cl. 209—166)

Fractionation of clay by particle size is desirable for various purposes, and is of particular advantage in the production of clay for the paper industry, e. g., not only clay to be used as filler, but especially clays to be used in coating compositions, notably in the manufacture of coated papers to have a high smoothness or gloss.

For example, a crude white clay which is mined at McIntyre, Wilkinson County, Georgia, and which essentially comprises clay or kaolin of satisfactory quality for paper use, has a clay particle size range from 40 to 50 microns in equivalent spherical diameter, down to a fraction of a micron. By far the major content is in particle sizes of not more than about 20 to 25 microns, and it is within this content that fractionation to obtain products of finer particle size is ordinarily desired; the larger clay particles being either inconsequential or susceptible of reduction by grinding, or being eliminated in part by the cleaning treatments employed to remove contaminating particles, such as mica, sand, ilmenite, tourmaline, particles of iron compounds, and clay particles substantially contaminated with compounds of iron or titanium. In reference to particle size, it will be understood by those skilled in the art that the "equivalent spherical diameter" of a clay particle is the diameter as calculated from sedimentation measurements, which diameter has been proven to approximate very closely the mean of all diameters, in various directions, of the actual particle.

As an instance of fractionated products, one such grade of clay that has been marketed has a particle size analysis of less than 1% of a size larger than 12 or 13 microns and substantially no particles larger than 15 or 16 microns. This grade, sold by the proprietors of the above-mentioned mine at McIntyre, Georgia, is called "HT" and provides a good paper coating with satisfactory smoothness and gloss. Another and finer clay fraction contains not more than 2% in particle size larger than about three and one-half microns and is substantially free of material coarser than 4 or 5 microns. This product, made by the same company and called "Satin", is a very fine quality coating clay, susceptible of being calendered to an extremely high smoothness and gloss. It will be understood that each of these fractions contains substantial quantities of particles smaller than the stated maximum, and indeed ranging down to fractions of a micron. It may also be explained that when the cleaned or purified clay is treated to produce these products (e. g., "Satin" and "HT"), the residue fractions, consisting mostly of particle sizes from 20 or 25 microns down to 10 or 5, also constitute a salable product for the paper trade, particularly for filling.

Heretofore, the procedure for washing and cleaning the clay, and particularly the fractionating procedure, has usually involved extensive and relatively costly operations. The apparatus includes not only traps and settling troughs for sand and other impurities, but for fractionation, equipment such as specially designed centrifugal machines, mills, and large sedimentation basins; and special de-flocculating treatments have been required in connection with centrifuging and sedimentation. It is accordingly an object of the present invention to provide improvements in clay processing, particularly for fractionating clay (i. e., as to particle size) with a notable ease of control, substantial economy and high efficiency of operation, and with much simpler or less expensive apparatus, than has generally been required heretofore. Another object is to provide a simplified procedure which may provide, in a unified operation, both for cleaning or purifying the clay and for fractionating it to a desired particle size; further objects including such as are hereinafter stated or apparent or are incidental to the practice of the invention.

To these and other ends, it has now been discovered that a clean and satisfactory fractionation of clay, as to particle size and particularly for the reduction of the content of the given clay in particles larger than any predetermined size, may be accomplished by froth flotation, e. g., treatment of the clay slip in the presence of suitable reagent material and in suitable aerating apparatus, to produce a froth which selectively tends to elevate in the froth the finer clay particles. Under the selected circumstances, the clay-elevating tendency of the froth may be adjusted or made progressively more effective for the finer clay particles; the fragility of the froth and other factors being thus controlled, for instance as hereinafter explained, for recovery of a clay concentrate which is substantially free of material coarser than the maximum particle size desired.

According to present understanding of the process, advantage is taken of the affinity of suitable frothing reagent material, such as sulfite waste liquor, for clay particles, and of the discovery that upon incorporating such reagent in a slip or pulp of the clay to be fractionated, froth flotation treatment of the pulp is susceptible of ready control to obtain a definite selectivity toward particles not larger than any given size. Among the factors that may be regulated to that end are the solids content of the feed, the amount of reagent, and time of rise or other travel of the froth from its origin to the place of overflow and collection—the average time of rise being dependent on the height of the froth column and on the rate of aeration.

Although in the rising froth the clay is distributed all over the surfaces of the bubble films, the ability of the froth to carry the clay tends to vary in an inverse relation to the particle size; and thus the action is not analogous to the flotation separation of one material from a different material, i. e., where the particles of the concentrate differ in chemical composition or in physical structure or even in density, from those of the tailing. For instance, the more fragile or the more mobile the froth or the further it has to rise in a column before its overflow and collection, the greater seems to be the tendency for larger particles to break through or fall between the bubbles and thus accumulate in the tailings. Extensive tests have also revealed that the cleanness of fractionation is in considerable measure dependent upon the number of successive flotation treatments. Thus for instance, with reagents of the character mentioned, it has been found desirable to employ a series of three or four cells in order to obtain fine fractions corresponding, say, to "Satin" or "HT" grades, when the original feed is simply a pulp of the crude clay. In other cases, however, as where fractionation is desired of an already partly refined clay, one or two froth flotations may suffice.

It has also been found by test that the extent of fractionation (i. e., the extent of elimination of particles larger than a given size) varies for a given cell or setup of cells, in accordance with the solids content of the feed. In general, the more dilute the pulp at the feed end of a cell, the greater is the percentage of the finer or finest particles in the concentrate with respect to the actual amount of solids in the feed.

Not only is the procedure applicable to production of concentrates having desired fineness in any given operation, but the tailings in a given setup may themselves amount to a fraction of another sort (for example, the residue fractions mentioned hereinabove) or may be subjected to further like treatment for separation of impurities (e. g., where the original material was a crude clay) and even for further fractionation of relatively coarse sizes if desired. As indicated above, moreover, the application of the invention to crude clays has the further advantage that various contaminating particles, for instance those mentioned hereinabove, are removed during fractionation, usually in the first or second cells of the system used for treatment.

It has been found that for production of a good froth responsive to particle size, the apparatus should preferably be of the type embodying direct aeration, as by blowing air or other gas into the pulp. Thus, for example, good results have been had with the Callow type of froth flotation cell, wherein the aeration is directly obtained by blowing air through, and subdividing it with, a fine canvas screen beneath the pulp column. Especially advantageous operation has been achieved with a cell providing both direct aeration and self-agitation, and comprising a series of ducts extending down into a central plup chamber for blowing air into the pulp, and adjacent frothing chambers to which the agitated and aerated pulp passes and in which a rising froth column, advantageously of substantial height, is produced to pass over into suitable collecting launders. It will be understood that in such cells the central chamber is preferably separated from the frothing chamber by depending baffles extending down into and slightly below the normal pulp surface, and that upon the vigorous injection of air, the pump is not only aerated, but effectively agitated as it circulates in the central chamber and thence to the frothing chambers. Substantially submerged baffles, clearing the bottom of the cell, extend along each side of the series of air ducts in the central chamber to afford circulation over such baffles and under the other baffles, into the froth chambers.

The drawing shows a schematic diagram of one system in which the invention has been employed, and certain specific examples of the invention are hereinafter described, but it will be understood that these procedures and apparatus are set forth only by way of illustration and that the invention is susceptible of modification in many respects, which will be readily appreciated by those skilled in the art.

By way of specific instance, the hereinabove described, untreated white clay from a mine at McIntyre, Georgia, was subjected to the following procedure in the apparatus indicated in the drawing to obtain a fine fraction equal to the above-described "HT" grade: The clay was blunged with water to produce a slip containing about 25% solids, and after passing the slip through sand-cone separators to remove coarse material such as coarse sand, gravel and the like, sulfite waste liquor was incorporated in the proportion of about 25 pounds per ton of dry clay. In this run the sulfite waste liquor was one obtained from a wood pulp mill in Maine, and was derived from sulfite treatment of a blend of northern spruce and northern hemlock; it appearing from other tests that sulfite liquor from these woods has preferable qualities for the purposes of the present invention. The liquor had been somewhat evaporated, to have a specific gravity of about 1.28, i. e., so as to weigh about 10½ pounds per gallon.

After thorough mixing to obtain full permeation of the liquor in the crude clay suspension—such permeation being apparently desirable to attain the optimum intimate action on the clay in the flotation treatment—the resulting slip or pulp was fed to a flotation apparatus comprising four cells of the combined agitation and aeration type described hereinabove. The four cells are diagrammatically shown in the drawing; as there set forth, the apparatus was conveniently so arranged as to feed the froth concentrate from each cell (except the last) to the feed end of the next one in the series, and it was found desirable to break down the froth in each such transfer, for instance by running each froth to a corresponding storage tank and pumping the resulting refined pulp from the bottom of the tank to feed the next cell. The froth from cell No. 4 was collected, for recovery therefrom of a highly refined clay; and the cells were connected in a closed circuit at the tails ends, so that the only tailings came from No. 1 cell. That is, the tailings of the fourth cell were returned into the feed of the third, those of the third into the feed of the second, and those of the second into the feed of the first, whereby the final concentrate consisted of the collected froth of the fourth cell and the final tailings were taken from the end of cell No. 1. Operation was had at the rate of about one ton of original clay feed (dry weight of clay) per hour, and with an air pressure in the aeration ducts, of about one pound per square inch.

Although the dimensions and proportions of the apparatus may be varied to suit the requirements of any given installation and use, the four cells used in the foregoing operation each had froth-collecting gates and launders running lengthwise on both sides; each froth gate of the No. 1 and No. 2 cells was about eight feet long, those of the No. 3 cell about four feet long and those of No. 4 about three feet, six inches long. As determined by the height of the tail gate, each cell had a pulp level or column about 24 inches high, and in the froth chambers a froth column about 30 inches high, to the edge of the froth gate. Air was supplied through a multiplicity of one-half inch pipes spaced lengthwise on about 3-inch centers and extending vertically down to a point near the bottom of the aerating chamber, as explained above.

The run specifically described above was carried on continuously for 31 hours, with a total feed of 33 tons of crude clay (dry weight) and the concentrate yield was about 75%. The concentrate, which was the froth concentrate from the No. 4 cell, was collected in the collecting tank and was found to contain about 23% solids. Examination and tests of the concentrate showed it to consist of a fine clay fraction of very good "HT" quality. That is, the thus fractionated product was not only free of any appreciable content of contaminating particles, but consisted of substantially pure kaolin containing not more than about 1% larger than 12 or 13 microns in particle size, and substantially no particles larger than about 15 microns. Paper coating test with the fractionated product showed a smoothness, uncalendered, of 14 seconds on the Williams smoothness tester, which was equivalent to the results of identical coating tests (casein adhesive) with a good quality of the so-called "HT" clay made by the older procedures described above.

Other runs were made with the same apparatus, and comparable or better results obtained. Thus in one such other run, the feed was diluted to about 14% solids and was effected at a rate of about ¾ of a ton of crude clay per hour. The concentrate from the No. 4 cell contained about 5% solids and represented a yield of about 10%. The changed conditions afforded a further or finer fractionation: in this instance, the same paper coating test on the product showed a smoothness, uncalendered, of about 20 seconds.

In a still further run with the same apparatus, the dilution and rate of feed to No. 1 cell were the same as in the last-mentioned instance; the reagent being in the same proportions in this as well as both of the above runs, viz., 25 pounds of the sulfite waste liquor per ton of crude clay. In this further run, however, further dilution was effected by adding clear water into the feed end of No. 4 cell, in an amount not quite equal in volume to the pulp feed to that cell (i. e., the No. 3 concentrate as fed from its re-pulping tank). By virtue of the closed circuit connection, the added water was circulated through the system so that in time, as the system settled down and became balanced, further dilution was thus effected for the feed of each cell. The concentrate (of No. 4 cell) contained about 3% solids and afforded a yield of about 4½%; but the thus fractioned product was finer than in the previous runs. The same paper coating test of a representative sample produced a smoothness, uncalendered, of 23 seconds, representing a product considerably finer than "HT" and not a great deal coarser than the finest or "Satin" grade hereinabove identified.

Other tests, particularly for coating smoothness and gloss, confirmed the above-stated determinations of the results of these runs, and like tests made on samples taken from the tailings and from the concentrates of intermediate cells in the system as operated, showed that the fractionation was selective in accordance with the number of cells used—i. e., the product becomes increasingly finer in maximum particle size, with the number of times it is subjected to the flotation operation.

It will be understood that the tailings from operations of the invention, for example those described above, may be subjected to further flotation not only for cleaning (to obtain a relatively coarse though useful fraction) but for further fractionation in some cases—for instance in the case of the run last above set forth, to obtain an intermediate fraction somewhat coarser than the "HT" grade but measurably finer than the ordinary cleaned clay.

It will also be understood that the fractionated product of the invention—e. g., the concentrate from the system illustrated—may be subjected to the usual bleaching procedure where the inherent colors of the clay is darker than desired, and for use or shipment may be collected by filtration and dried, in the usual manner.

The fractionating procedure of the invention has also been successfully carried out with the Callow type of flotation cell. Numerous runs have been made with such equipment and equally good fractionation obtained. In one representative run, the original feed (crude clay) contained 25% solids and the fractionating reagent was sulfite waste liquor incorporated in the feed in the proportion of 35 pounds per ton of crude clay. The clay was refloated through the Callow cell 3 times, using only the previous concentrate for each operation after the first, and discarding all tails. Dilution was progressively increased in the successive feeds, so that in the last flotation the feed contained about 6% solids. As constructed the Callow cell afforded a pulp column about 24 inches high and a froth column (to the edge for overflow) of about 30 inches. The final concentrate from the last stage contained about 1.5% solids (the recovery being about 5%, relatively low because of the discard of all tailings for simplification of test), and was found to consist of a very fine clay fraction. Tests of the thus fractionated product, including the paper coating test, which yielded an uncalendered smoothness of 48 seconds, demonstrated its full equivalence to the "Satin" grade, containing practically no particles larger than three to three and one-half microns.

The Callow cell appears to yield a more fragile froth, and thus a somewhat increased selectivity toward the finer particles, than the cells in which the aeration is accompanied by considerable agitation, but a higher recovery (e. g., in dealing with any given fraction other, perhaps, than the very finest) has been obtained with cells of the latter type.

As stated, an example of a suitable reagent is sulfite waste liquor, and although other sulfite waste liquors or their concentrates or extracts may be used in many cases (e. g., "super-spruce" and "Spruce extract", which are commercial solid products understood to be derived by evaporating waste liquor from sulfite wood pulp mills), the partially evaporated product of the character specified hereinabove has been especially satisfactory. It can be added in various ways, as in the water used to make the clay slip or preferably by mixing it thoroughly into the slip or pulp. While the quantity of such reagent is not critical within the range, say, from 15 to 35 pounds per ton of clay treated, it has been found that the toughness of the froth increases to some extent with the amount of the reagent, e. g., sulfite waste liquor or equivalent material having like action. By the same token, change in the solids content of the feed, with the proportion of reagent to dry solid constant, tends to alter the froth; the more dilute the feed, the more fragile the froth and thus in general, the greater its selectivity for the finest particles.

Certain further factors, as explained above, may be collectively expressed as the time of rise of the froth column, e. g., the average time consumed as the bubbles travel from the pulp to the top of the froth gate over which they flow into the launder; generally speaking, the longer the time of rise, the greater the particle size selectivity. It appears that as the froth travels up in the column, a partial breakdown is constantly going on, permitting more and more of the large particles, and greater numbers of particles of intermediate size, to fall back into the pulp. The time of froth rise is dependent upon the height of the froth gate above the tails gate, upon the amount of air flow into the cell (the greater the flow, the faster the rise), and to some extent by the solids content of the pulp,—it being generally observed that the greater the solids content of the pulp (other things being equal) the faster the rise of the froth column. For example, in the first example set forth hereinabove, in the production of "HT" grade of clay, the average time of froth rise appeared to be about 15 to 20 seconds, i. e., about 20 seconds in cell No. 4, and progressively less in the earlier cells, down to 15 seconds or somewhat less in cell No. 1. On the other hand, in operating with the Callow cell in making "Satin" clay, the froth rise in the final flotation consumed at least about a minute, and times of the order of 30 seconds or more in the earlier flotations.

Although for simplicity of explanation and for ease of determination in making tests (analysis of concentrates being most conveniently made by comparison with known standards of clay) the foregoing description has been chiefly related to the specific grades of clays named, it will be understood that the procedure is susceptible of producing any of a great variety of clay fractions, simply by suitable regulation of the controlling factors as will now be readily understood by those skilled in the art.

Indeed, in view of what has now been explained, the successful application of the invention to produce a desired clay fraction under any given circumstances is a matter of appropriate design or regulation of controlling factors such as the solids content of feed, the amount of reagent, the height of the froth column, the extent of aeration and agitation and the number of successive flotations. It is manifestly unnecessary here to specify the exact values of these factors which will be best in other than the illustrative examples set forth above. The principles of the invention having been explained, the optimum conditions to obtain a clay fraction of a desired fineness of particle size from any given starting material (be it crude clay, cleaned clay or the concentrate or tailing from a previous fractionation) can be readily and rapidly ascertained without extensive experiment but by simple adjustments or tests in accordance with the above-noted effects of the several factors—all as will now be understood by those familiar with the prerequisites to setting up a successful flotation plan, embodying any ordinary or previously known concentration process.

The various smoothness determinations on coated paper were made, as stated, with the Williams smoothness tester, a standard and widely used device for such purpose. In this apparatus, the coated sheet under test is centrally perforated and placed on a circular platform which has a central air passage and a gum rubber facing for sealing contact with the paper. The surface to be tested faces up and a plane surfaced glass disc is pressed down against it. The air passage in the platform (leading to the aperture in the paper) connects with a pump and with a chamber for controlling a mercury column; the latter being initially adjusted to a fixed low level. The pump piston is then forced down, compressing the air in the chamber and raising the mercury to an electric contact, which sets off an electric clock. The compressed air now flows out between the paper and the glass disc, while the clock runs, and when the mercury drops to a second electrical contact at a predetermined low level, the clock is turned off. The time is thus automatically measured for the flow of a fixed volume of air out between the coated surface and the glass disc; the smoothness readings thus being in seconds—the higher the smoothness, the longer the time of air flow.

It will be understood that the invention is not limited to the procedures herein illustrated and described, but may be extended to or employ equivalents, and may be carried out in other ways, without departure from its spirit.

What is claimed is:

1. In a method of treating clay material to fractionate the same in particle size to obtain a clay fraction having a maximum particle size which is smaller than 20 microns, and wherein the clay material includes a substantial content of clay particles at least as small as about 20 microns and larger than the maximum of the desired fraction, the steps of establishing a pulp of the clay material and subjecting the same to froth flotation treatment in the presence of sulfite waste liquor, including aerating the pulp to produce a moving, clay-carrying froth and collecting the froth at the end of its travel, while maintaining a sufficiently low solids content in the pulp, sufficient fragility of froth bubbles and sufficient time of travel of the froth, in correlation to inhibit support by the collected froth of clay particles larger than the aforesaid maximum.

2. In a method of treating clay material to fractionate the same in particle size to obtain a clay fraction having a maximum particle size which is smaller than 20 microns, and wherein the clay material includes a substantial content of clay particles at least as small as about 20 microns and larger than the maximum of the desired fraction, the steps of establishing a pulp of the clay material containing sulfite waste liquor, aerating the pulp to produce a rising column of froth and collecting the froth from the top of the column, while coordinating and maintaining at a sufficiently high value the fragility of the froth and its time of rise to inhibit the support, in the froth concentrate, of clay particles larger than the aforesaid maximum.

3. In a method of treating clay material to fractionate the same in particle size to obtain a clay fraction having a maximum particle size which is smaller than 20 microns, and wherein the clay material includes a substantial content of clay particles at least as small as about 20 microns and larger than the maximum of the desired fraction, the steps of establishing a pulp of the clay containing sulfite waste liquor; subjecting the pulp to flotation treatment for production of a rising, clay-carrying froth column, said flotation treatment including aerating the pulp with the factors of the solids content of the pulp and the concentration of sulfite waste liquor therein maintained sufficiently low, the rate of aeration sufficiently slow and the height of the froth column sufficiently high, in correlation, to produce a froth having clay-elevating power substantially selective toward particles not larger than the aforesaid maximum; and collecting the elevated froth.

4. In a method of treating clay material to fractionate the same in particle size to obtain a clay fraction having a maximum particle size which is smaller than 20 microns, and wherein the clay material includes a substantial content of clay particles at least as small as about 20 microns and larger than the maximum of the desired fraction, the steps of establishing a pulp of the clay material and subjecting the same to repeated froth flotations in the presence of sulfite waste liquor, while maintaining sufficient fragility of the froth in each flotation operation and performing a sufficient number of said successive operations in correlation to produce in each operation a froth having clay-elevating selectivity for particles not larger than the maximum, and to produce a final froth concentrate substantially free of clay particles larger than the maximum, collecting the final froth concentrate, and separating the resulting fine fraction of clay therefrom.

5. A method of fractionating clay material which contains a substantial content of clay particles at least as small as about 20 microns and larger than the desired fraction, to obtain a clay fraction of not larger than a predetermined fine particle size, said predetermined particle size being a size smaller than 20 microns, comprising subjecting a pulp of the clay to a plurality of successive froth flotations in the presence of sulfite waste liquor, while maintaining the factors of the solids content of feed and the amount of sulfite waste liquor sufficiently low, the height of froth columns sufficiently great and the extent of aeration sufficiently small, in correlation with each other and with a sufficient number of successive flotations, to produce a final froth concentrate substantially free of clay particles larger than the aforesaid predetermined size.

6. In a method of treating clay material to fractionate the same in particle size to obtain a clay fraction having a maximum particle size which is smaller than 20 microns, and wherein the clay material includes a substantial content of clay particles at least as small as about 20 microns and larger than the maximum of the desired fraction, the steps of establishing a pulp of the clay material, and subjecting the pulp to froth flotation operation in the presence of sulfite waste liquor, said flotation operation including aerating and agitating the pulp to produce a rising froth column, with the factors of solids content of feed and the concentration of sulfite waste liquor maintained sufficiently low, the height of the froth column sufficiently great, and the extent of aeration and agitation sufficiently small, in corelation, to produce a froth having a fragility and time of rise adapted to reject clay particles larger than the aforesaid maximum, and collecting the froth from the top of its column.

GEORGE J. LANE.
DONALD S. PHELPS.